US006116835A

United States Patent [19]

Blacket et al.

[11] Patent Number: 6,116,835

[45] **Date of Patent: *Sep. 12, 2000**

[54] CARRIER TAPE FOR FASTENERS

[75] Inventors: Stuart Edmund Blacket, Closeburn; Ralph Fuhrmeister, Runcorn, both of Australia

[73] Assignee: Henrob Ltd., Clwyd, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,385

[22] Filed: Jul. 30, 1997

Related U.S. Application Data

[63] Continuation of application No. 08/615,284, filed as application No. PCT/AU94/00601, Oct. 3, 1994, abandoned.

[30] Foreign Application Priority Data

Oct. 1, 1993 [AU] Australia ..................................... 1567

[51] Int. Cl.[7] ...................................................... F16B 15/08

[52] U.S. Cl. ............................ 411/442; 411/443; 206/341

[58] Field of Search .................................... 411/442, 443, 411/444, 966; 206/345–347, 341, 343, 338

[56] References Cited

U.S. PATENT DOCUMENTS

| | | | |
|---|---|---|---|
| 2,771,610 | 11/1956 | Smith | 206/347 |
| 3,211,284 | 10/1965 | Austett | 206/56 |
| 3,342,327 | 9/1967 | Newton | 206/347 |
| 3,611,870 | 10/1971 | Jdert | 89/35 |
| 3,731,723 | 5/1973 | Lemanchec | 145/129 |
| 3,774,755 | 11/1973 | Cast et al. | 206/56 DF |
| 3,779,373 | 12/1973 | Maier | 206/56 DF |
| 3,892,313 | 7/1975 | Lange | 206/346 |
| 3,904,032 | 9/1975 | Maier | 411/442 |
| 3,944,068 | 3/1976 | Maier | 411/442 |
| 4,004,683 | 1/1977 | Pomeroy | 206/3 |
| 4,018,334 | 4/1977 | Lejdegard | 206/346 |
| 4,072,261 | 2/1978 | Livio | 227/130 |
| 4,098,169 | 7/1978 | Gawlick | 89/35 R |
| 4,560,061 | 12/1985 | Haytayan | 206/347 |
| 4,606,455 | 8/1986 | Grikig | 206/347 |
| 4,920,885 | 5/1990 | Bowman | 102/281 |
| 4,932,821 | 6/1990 | Stefen | 411/442 |
| 4,955,476 | 9/1990 | Nakata | 206/347 |
| 5,046,396 | 9/1991 | Pfister | 411/442 |
| 5,092,460 | 3/1992 | Satoh | 206/347 |
| 5,208,420 | 5/1993 | Jena | 102/531 |
| 5,234,104 | 8/1993 | Schulte | 206/247 |
| 5,244,088 | 9/1993 | Musil | 206/338 |
| 5,443,345 | 8/1995 | Gupta | 411/442 |
| 5,492,065 | 2/1996 | Jena | 102/531 |
| 5,509,768 | 4/1996 | Hon | 411/442 |
| 5,522,687 | 6/1996 | Chen | 411/442 |
| 5,713,709 | 2/1998 | Huang | 411/442 |
| 5,719,348 | 2/1998 | Bill | 86/38 |
| 5,788,445 | 8/1998 | Huang | 411/442 |

FOREIGN PATENT DOCUMENTS

| | | |
|---|---|---|
| 243900 | 4/1963 | Australia . |
| 31243/71 | 1/1973 | Australia . |
| 31244/71 | 1/1973 | Australia . |
| 31437/71 | 1/1973 | Australia . |
| 79589/75 | 9/1976 | Australia . |
| 38413/78 | 1/1980 | Australia . |
| 93/09918 | 5/1993 | WIPO . |

*Primary Examiner*—B. Dayoan
*Assistant Examiner*—Gary Estremsky
*Attorney, Agent, or Firm*—Foley & Lardner

[57] ABSTRACT

A carrier tape for fasteners includes a substantially planar web, a plurality of substantially equally spaced holes formed in the web to receive the stems of the fasteners, and a plurality of spaced, discrete formations integrally joined to the web. Each of the formations is designed to releasably engage the head of a fastener with the stem of the fastener received in a respective hole. The formations are upstanding from a top surface of the web and have an inwardly directed engagement portion spaced from the web which, in use, engages the heads of the fasteners so that the heads are received between the engagement portion and the web. The formations are deformable to allow a fastener driving means to pass downwardly to permit the fasteners to be driven through the web and thereby released from the tape.

6 Claims, 14 Drawing Sheets

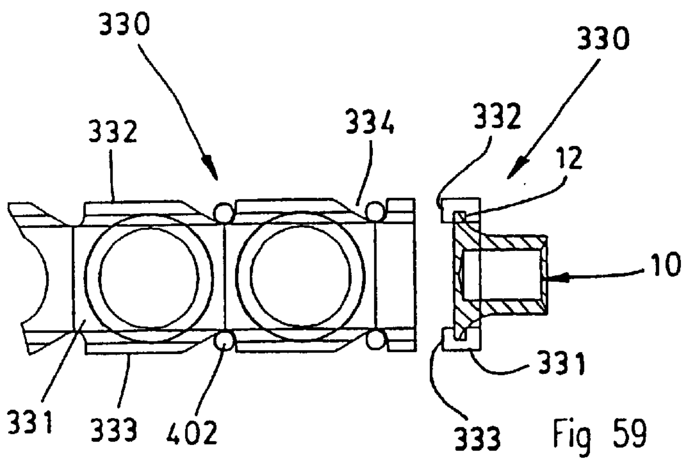
Fig. 58
Fig 59
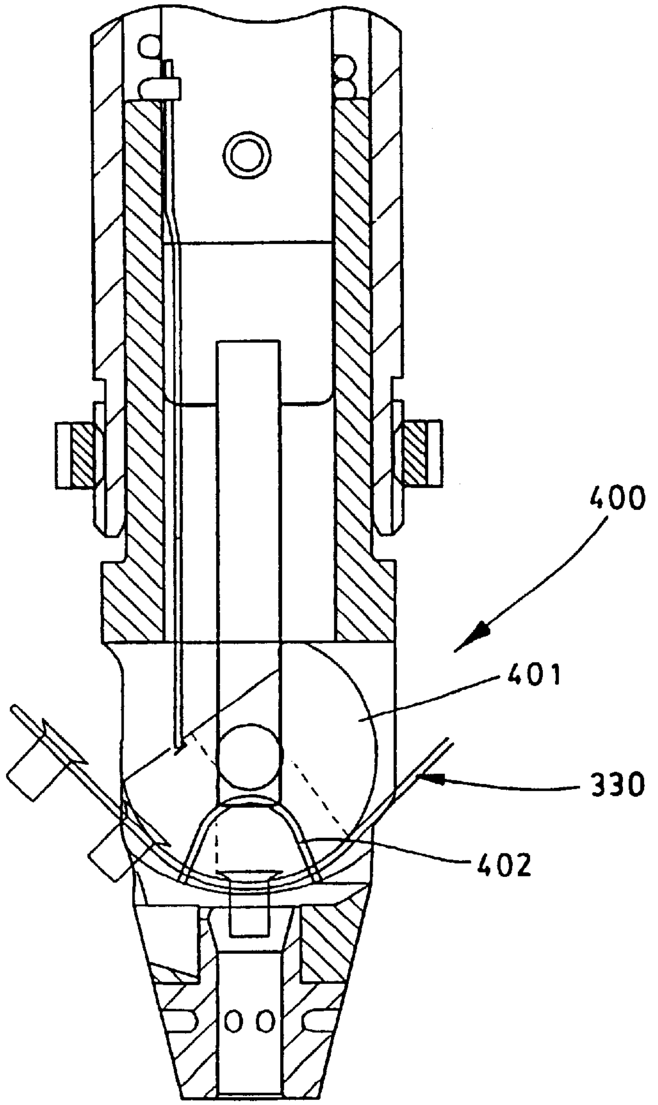
Fig 60

CARRIER TAPE FOR FASTENERS

This application is a continuation of application Ser. No. 08/615,284, now abandoned filed Mar. 27, 1996 (which is the National Phase of PCT/AU94/00601, filed Oct. 3, 1994).

BACKGROUND OF THE INVENTION

1. Field of the Invention

THIS INVENTION relates to a carrier tape for fasteners.

The term "fastener" shall include rivets; screws; clips; studs; rivets or slugs for clinching/press joining/integral fastening; stand-off pins; locating pins and other fastening devices.

2. Prior Art

International Application No. PCT/AU92/00621 (=WO 93/09918) (Henrob Ltd et al) discloses a range of carrier tapes for fasteners where the fasteners may be released from the tapes by being pushed axiably through, or transversely to, the webs of the tapes; where the tapes have teeth or holes engageable by drive means in the feeder heads for accurate delivery of the fasteners into alignment with the punches; and where the tapes can be fed around small radius curves to enable fastening of sheets in confined spaces, eg. in automobile assembly operations.

The tapes disclosed in PCT/AU92/00621 have generally proved successful in most fastening applications. However, in some automobile applications, problems have arisen. With very short rivets now being used in automobile applications, the very short plain stem length leaves little stem length for engagement in existing carrier tapes.

In addition, the large radius under the head means the rivet head must be left high in the tape, and the high centre of gravity causes the rivets to tip or fall out.

SUMMARY OF THE PRESENT INVENTION

It is an object of the present invention to provide at least one means for releasably restraining the fasteners in the tape as they are delivered to the punch.

It is a preferred object to provide a carrier tape where the fastener restraint means also includes means for engagement with the tape feeder.

It is a further preferred object to provide a carrier tape wherein the fastener heads are protected during feeding to the punch and advancement by the punch into the workpieces.

It is a still further preferred object to provide a carrier tape where the fasteners are substantially enclosed during collation in the carrier tape, storage and feeding to the punch.

Other preferred objects will become apparent from the following description.

The term "stem" of a fastener shall be hereinafter used to also include a "shank" of a fastener.

In one aspect, the present invention resides in a carrier tape for fastening the tape, including:

- a substantially planar web;
- a plurality of substantially equally spaced holes provided or formed in the web to receive the stems of the fasteners; and
- at least one formation or row of fingers or protrusions along the web to releasably engage the heads of fasteners with their stems received in the holes.

Preferably, at least one row of secondary holes or slots are provided along the web, or along the formation(s), for driving engagement with the drive means of a feeder head.

Preferably, weakening lines are provided transversely of the web, preferably equally spaced between the holes for the stems, to provide bending axes for the tapes. Weakening lines or slots may also be provided in the formation(s) in alignment with the weakening lines or slots in the web.

Radial or concentric weakening lines or cutouts may be provided about the holes for the stems to assist in the release of the stems from the carrier tape by the punch.

The formation(s) may be formed integrally with, or connectable to, the web.

In a second aspect, the present invention resides in a carrier tape for fasteners, the tape including:

- a substantially planar web;
- a plurality of substantially equally spaced holes provided or formed in the web to receive the stems of fasteners; and
- a secondary web or strip secured to the web to overlie the heads of the fasteners and releasably restrain the fasteners in the web.

In a third aspect, the present invention resides in a carrier tape for fasteners, the tape including:

- a substantially planar web;
- a plurality of substantially equally spaced holes provided or formed in the web to receive the stems of the fasteners; and
- elongate slots and/or annular grooves about the holes to releasably restrain the heads of the fasteners.

The web may be laminated from two or more superimposed strips secured together.

In a fourth aspect, the present invention resides in a carrier tape for fasteners, the tape including:

- a substantially planar web;
- a plurality of substantially equally spaced, substantially annular formations provided in, or formed along, the web;
- the formations having grooves and/or protuberances therein to releasably engage the stems and/or heads of the fasteners.

The fasteners may be driven from the formations, secured in the web; or the formations and fasteners may be simultaneously driven from the web. In the latter alternative, the formations may be configured to receive/engage/support components, eg. trim or cover strips to cover the fasteners.

The formations may be moulded in two or more portions hingedly or otherwise connected together.

In a fifth aspect, the present invention resides in a carrier tape for fasteners, the tape including:

- a substantially planar web;
- a plurality of substantially equally spaced holes provided or formed in the web to receive the stems of fasteners; and
- respective first and second side extensions hingedly connected to opposed sides of the web and so arranged, when a fastener is received in a hole, to at least partially overlie the web to restrain the fastener in the hole.

Preferably, the side extensions are formed integrally with the web and are connected thereto by a reduced thickness hinge.

Preferably, the side extensions, when overlying the web, are secured to the web by adhesive, R. F. welding or like bonding means.

In a sixth aspect, the present invention resides in a carrier tape for fasteners, the tape including:

- a substantially planar web;
- a plurality of substantially equally spaced holes provided or formed to receive the stems or heads of fasteners; and a row of slots along at least one side of the web, each slot being defined by a side wall at an angle to the longitudinal axis of the web and an end wall substantially transverse to the axis, so arranged that the tape may be advanced by one or more flexible, reciprocating drive means releasably engaging the slots.

BRIEF DESCRIPTION OF THE DRAWINGS

To enable the invention to be fully understood, a number of preferred embodiments will now be described with reference to the accompanying drawings, in which:

FIG. 58 is a sectional view of a fastener in the tape of FIG. 55;

FIG. 59 is a sectional view showing the engagement of a fastener in the tape of FIG. 56;

FIG. 60 is a side view of the engagement means of the tape o FIGS. 58 and 59 in a fastening machine.

DETAILED DESCRIPTION OF THE PREFERRED EMBODIMENTS

Figure 1:
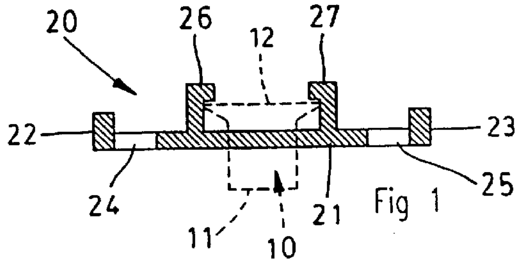
FIG. 1 is a sectional end view of a first embodiment of the carrier tape.

The carrier tape 20 of FIG. 1 has a substantially planar web 21 interconnecting side flanges 22, 23. The stems 11 of the rivets 10 are received in central equally spaced holes (not shown) and drive holes 24, 25 are provided along the sides of the web. A pair of inverted L-shaped formations 26, 27, integral with the web 21, engage the heads 12 of the rivets 10 to stabilise the rivets 10 and prevent their inadvertent release from the tape 20 out of alignment with the punch in the fastening machine (not shown).

Figure 2:
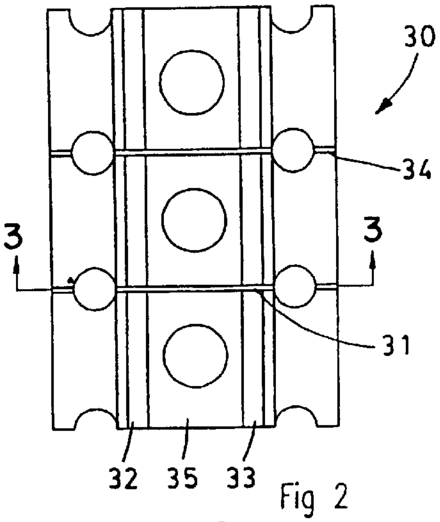
FIG. 2 is a plan view of a second embodiment.
Figure 3:
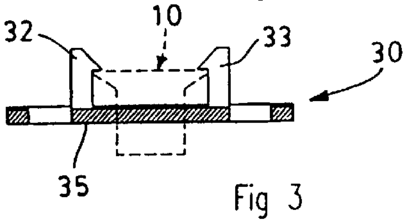
FIG. 3 is a sectional end view taken on line A—A on FIG. 2.

In tape 30 of FIGS. 2 and 3, the side flanges are omitted and weakening slots 31 are provided in the formations 32, 33 and weakening grooves 34 are provided in the web 35.

Figure 4:
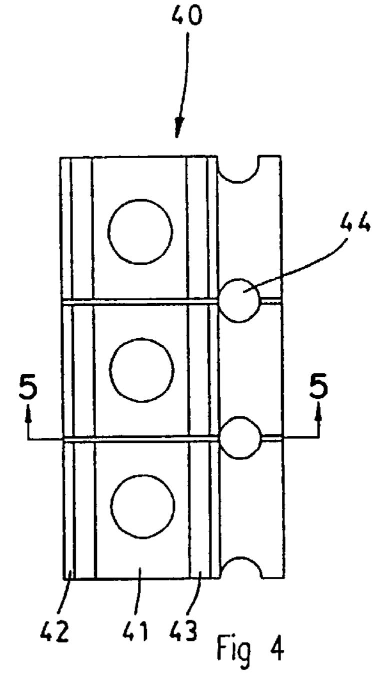
FIG 4 is a plan view of a third embodiment.
Figure 5:
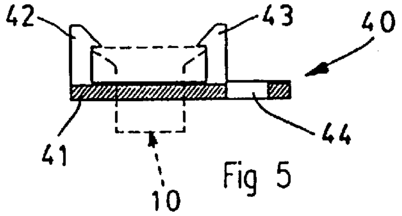
FIG 5 is a sectional end view taken on line A—A on FIG. 4.

Tape 40 of FIGS. 4 and 5 is similar to the tape 30 except that the web 41 extends past only one of the formations 42, 43 and only one row of drive holes 44 is provided in the web 41.

Figure 6:
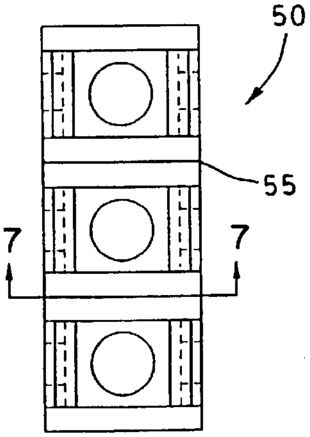
FIG. 6 is a plan view of a fourth embodiment.
Figure 8:
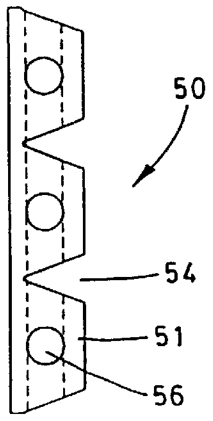
FIG. 8 is a side view of the fourth embodiment.
Figure 7:
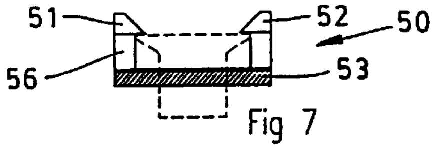
FIG. 7 is a sectional end view of the fourth embodiment.

Tape 50 of FIGS. 6 to 8 has formations 51, 52 along each side of the web 53, the formations being separated by V-shaped grooves 54 aligned with weakening lines 55 in the web 53 to enable the tape to pass around small radius corners. Drive holes 56 are provided in the formations 51, 52 to enable the tape 50 to be advanced. (Alternatively, the feeder may engage the V-shaped grooves to advance the tape.)

Figure 10:
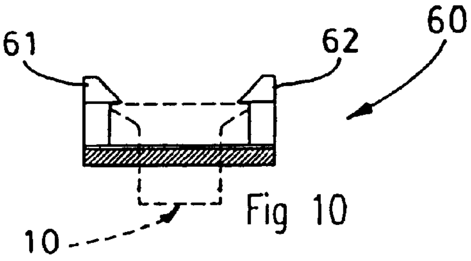
FIG. 10 is a sectional end view of the fifth embodiment.
Figure 9:
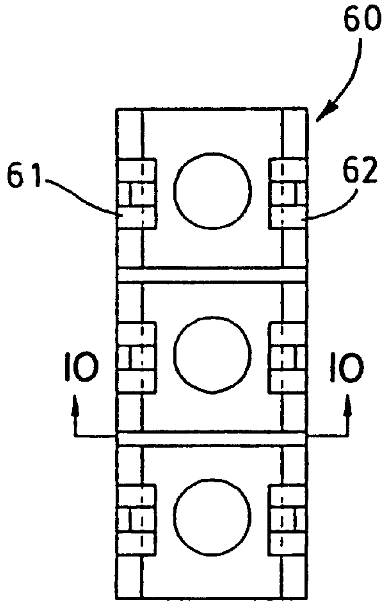
FIG. 9 is a plan view of a fifth embodiment.
Figure 11:
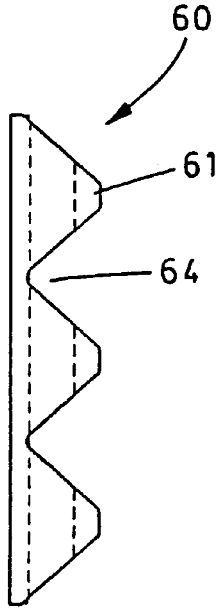
FIG. 11 is a side view of the fifth embodiment.
Figure 12:
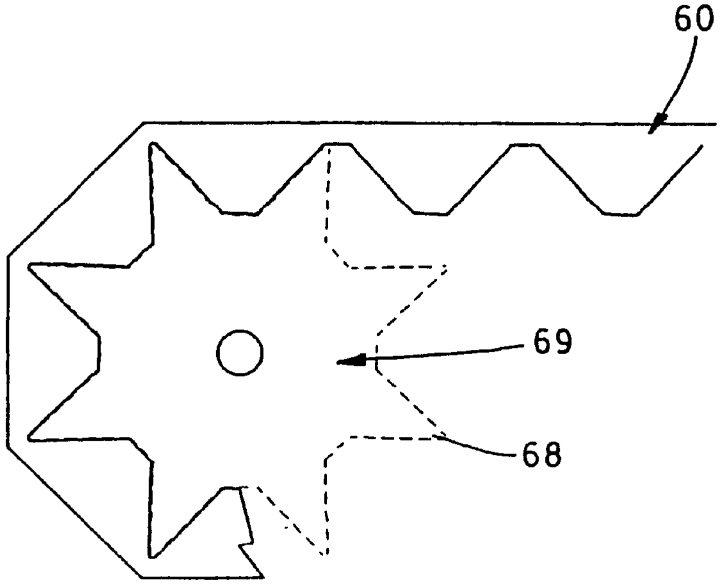

Tape 60 of FIGS. 9 to 11 is a modified embodiment of tape 50, where the formations 61, 62 and V-shaped grooves 64 form "teeth" to engage the teeth 68 of a drive sprocket 69 of the fastening machine or tape feeder (not shown) (see FIG. 12).

Figure 13:
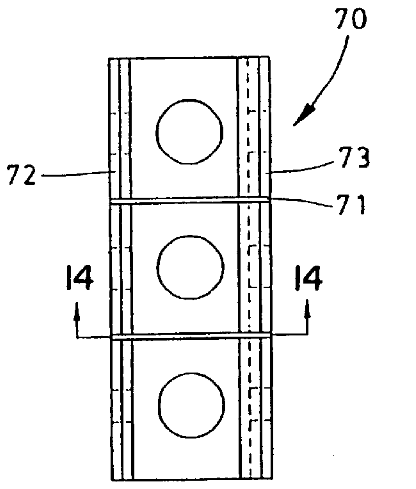
FIG. 13 is a plan view of a sixth embodiment.
Figure 15:
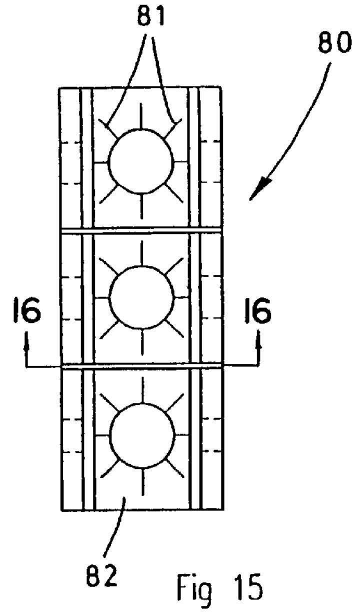
FIG. 15 is a plan view of a seventh embodiment.
Figure 14:
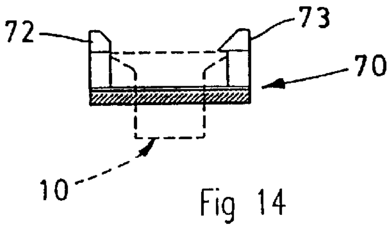
FIG. 14 is a sectional end view of the sixth embodiment.
Figure 16:
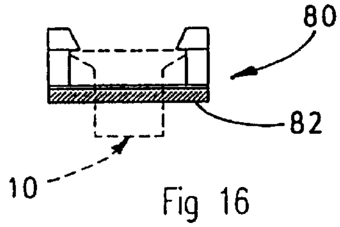
FIG. 16 is a sectional end view of the seventh embodiment.

The tape 70 of FIGS. 13 and 14 is similar to the tape 50 except that the V-shaped grooves are replaced by vertical slots 71 which separate the sections of the formations 72, 73 while the tape 80 (see FIGS. 15 and 16) is a modification of the tape 70 in that radial weakening lines 81 in the web 82 reduce the force required to release the fasteners 10 from the tape by driving them through the web 82.

Figure 17:
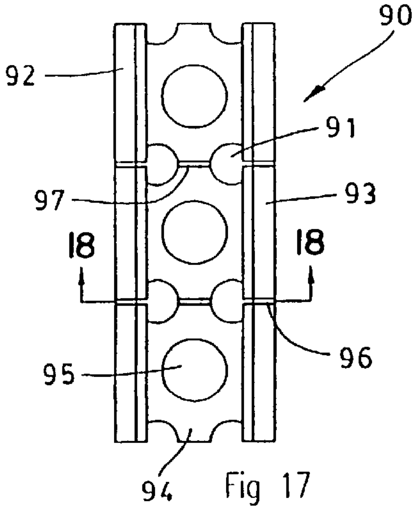
FIG. 17 is a plan view of an eighth embodiment.
Figure 19:
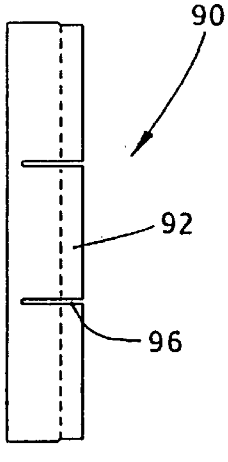
FIG. 19 is a side view of the eighth embodiment.
Figure 18:
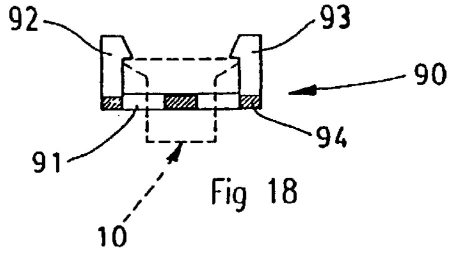
FIG. 18 is a sectional end view of the eighth embodiment.

In tape 90 of FIGS. 17 to 19, the drive holes 91 are provided between the formations 92, 93, equally spaced along the web 94 between the stem holes 95, and aligned with the slots 96 in the formations 92, 93 and the weakening lines 97 in the web 94.

Figure 20:
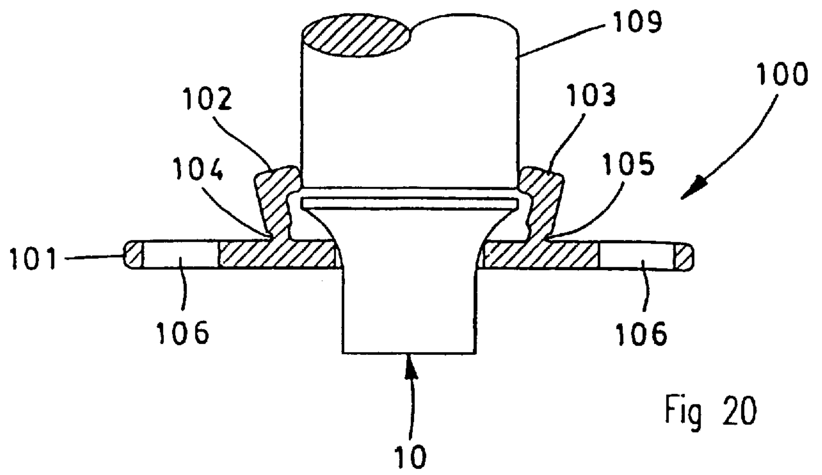
FIG. 20 is a sectional end view of a ninth embodiment.
Figure 21:
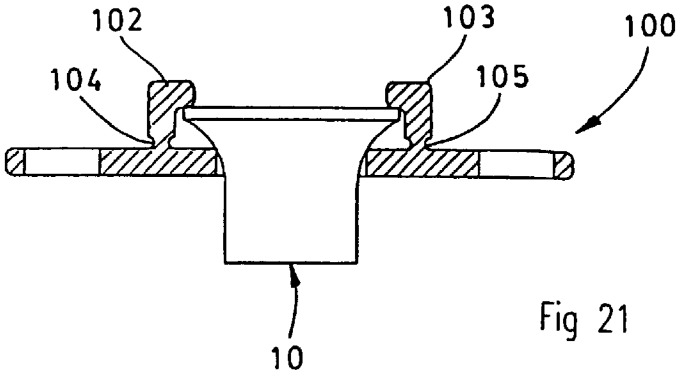
FIG. 21 is a sectional end view of the ninth embodiment.

Tape 100 of FIGS. 20 and 21 has "semi-rigid" formations 102 and 103 connected to planar web 101 by reduced thickness hinge lines 104 and 105. Drive holes 106 are provided along each side of the web 101.

The formations 102 and 103 may be urged outwardly when the fasteners 10 are engaged in the tape 100 and when a punch 109 expels the fasteners 10 from the tape 100.

Figure 22:
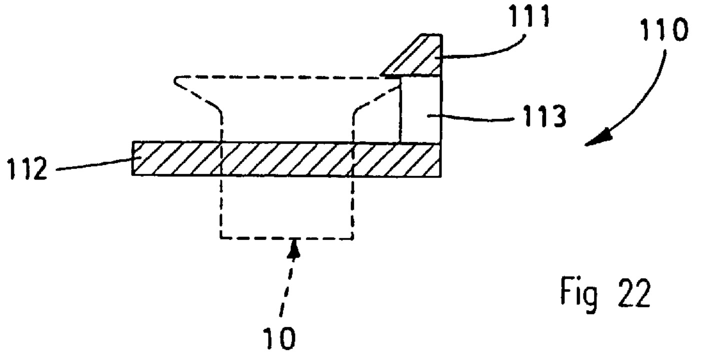
FIG. 22 is a sectional end view of a tenth embodiment.
Figure 23:
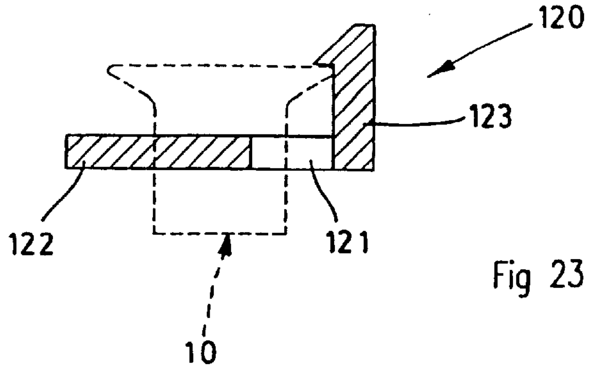
FIG. 23 is a sectional end view of an eleventh embodiment.
Figure 24:
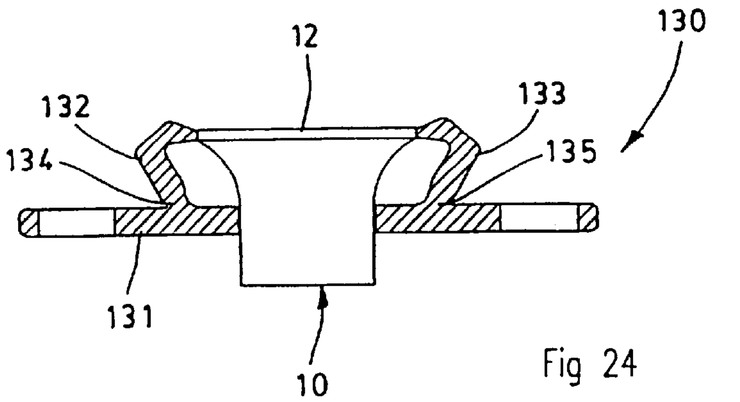
FIG. 24 is a sectional view of a twelfth embodiment showing the engagement with a fastener.
Figure 25:
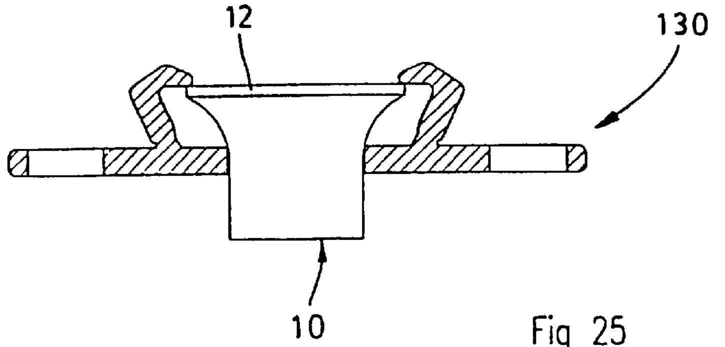
FIG. 25 is a sectional view of the twelfth embodiment showing the engagement with a different type of fastener.
Figure 26:
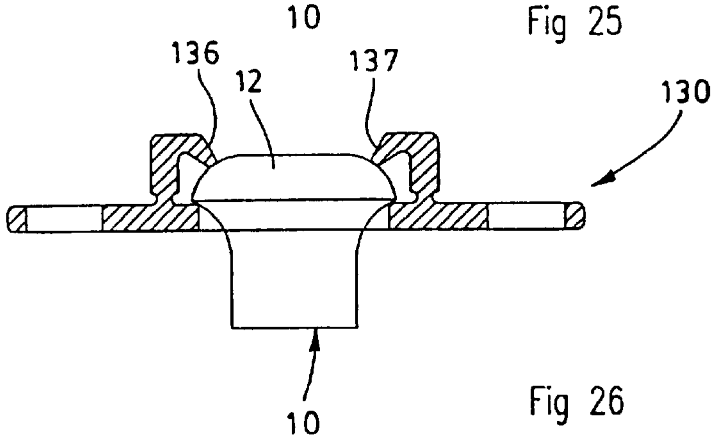
FIG. 26 is a sectional view of the twelfth embodiment showing the engagement with another different type of fastener.
Figure 27:
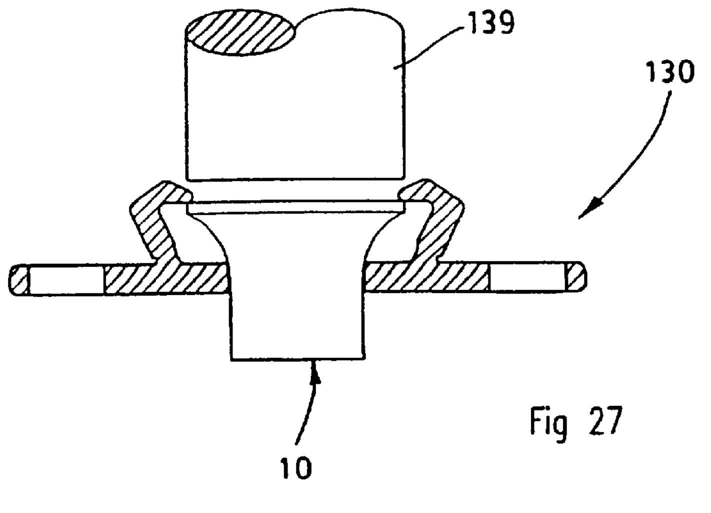
FIG. 27 is a sectional view of the twelfth embodiment showing the engagement with still another type of fastener.

In tape 110 of FIG. 22, only one formation 111 is provided along the web 112 to engage the rivet 10, the drive holes 113 being provided in the formation 111; while in similar tape 120 (see FIG. 23), the drive holes 121 are provided in the web 122 adjacent the formation 123.

FIGS. 24 to 27 show tape 130 which is a modification of the tape 100 of FIGS. 20 and 21. The side formations 132 and 133 are connected to the web 131 by integral hinges 134, 135. The formations 132, 133 have downwardly inclined faces 136, 137 to assist in the insertion of the fasteners 10 in the tape 130, and the expelling of the fasteners by a punch 139. It will be Noted that the formations 132, 133 can engage the fastener heads 12 at a range of fastener heights in the tape, and engage a range of fastener head configurations.

Figure 28:
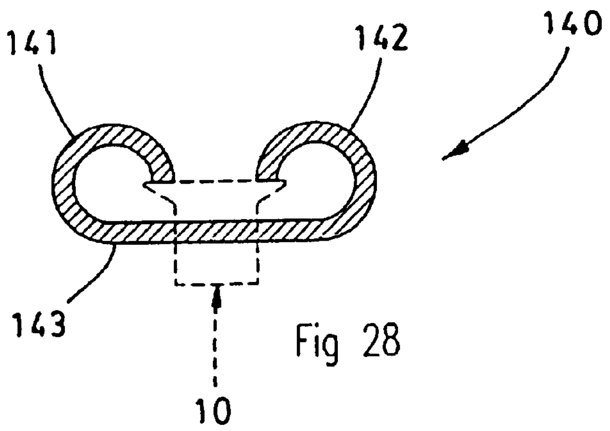
FIG. 28 is a sectional end view of a thirteenth embodiment.

In tape 140 of FIG. 28, the formations 141, 142 are formed as a combination of the web 143 by "rolling over" the sides of the web.

Figure 29:
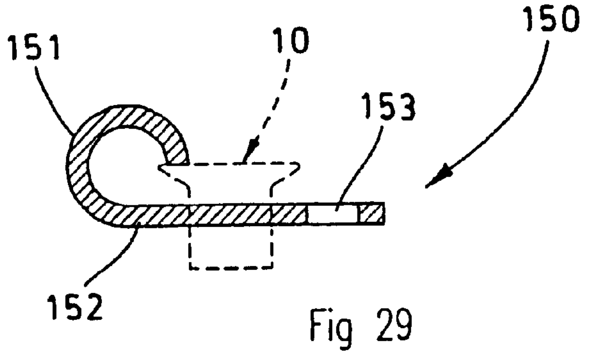
FIG. 29 is a sectional end view of a fourteenth embodiment.
Figure 30:
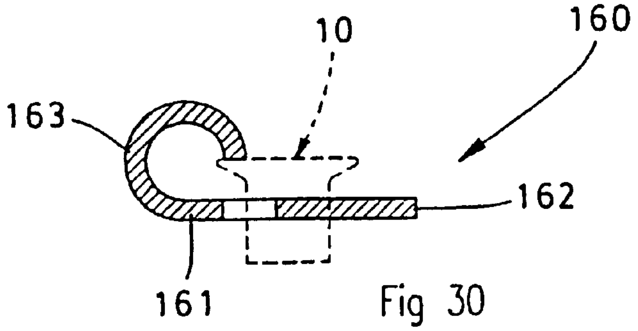
FIG. 30 is a sectional end view of a fifteenth embodiment.
Figure 31:
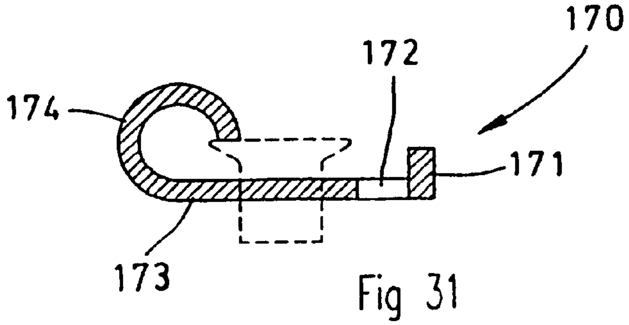
FIG. 31 is a sectional end view of a sixteenth embodiment.

Tape 150 of FIG. 29 has only one formation 151 formed out of the web 152, with drive holes 158 along the other side; whereas the tape 160 (see FIG. 30) has the drive holes 161 along the same side of the web 162 as the formation 163; and tape 170 (see FIG. 31) has a side flange 171 and drive holes 172 in the web 173 along the opposite side to the formation 174.

Figure 33:
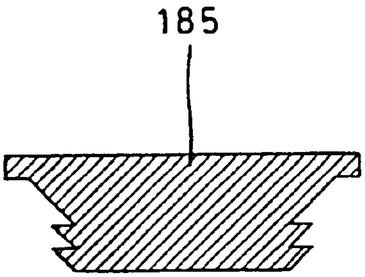
FIG. 33 is a sectional end view of a cover strip for the embodiment of FIG. 32.
Figure 34:
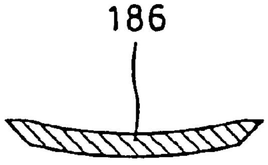
FIG. 34 is a sectional end view of an alternative cover strip for the embodiment of FIG. 32.
Figure 32:
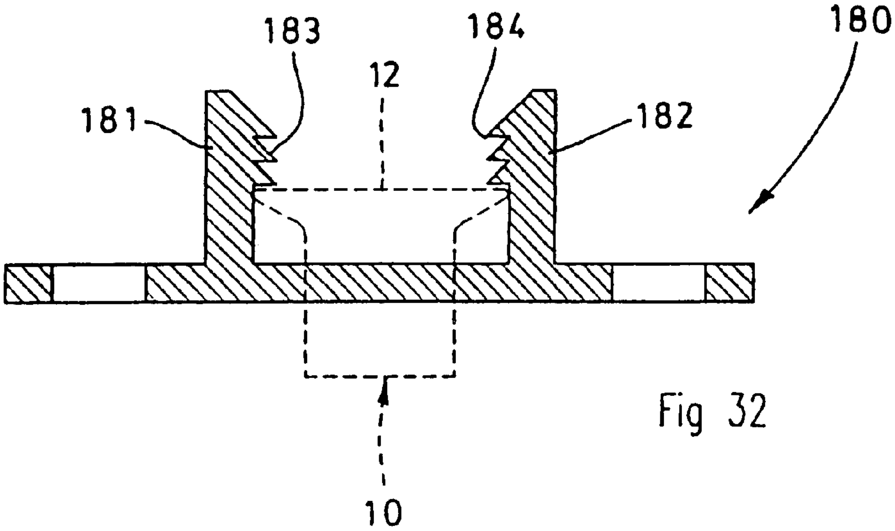
FIG. 32 is a sectional end view of a seventeenth embodiment.

The tape 180 of FIG. 32 is similar to tape 30 of FIGS. 2 and 3 except that the formations 181, 182 have serrated faces 183, 184 to engage the heads 12 of the rivets 10 and/or engage cover strips 185, 186 of FIGS. 33 and 34 which cover the heads 12 to protect the heads from damage during transport. The serrated faces 183, 184 enable the rivet heads to be engaged at different heights.

The cover strips 185, 186 can also be used where the heads 12 of the rivets 10 are coated and are to be protected from damage by the punch of the fastening machine as the rivets 10 are engaged in the workpieces.

Figure 35:
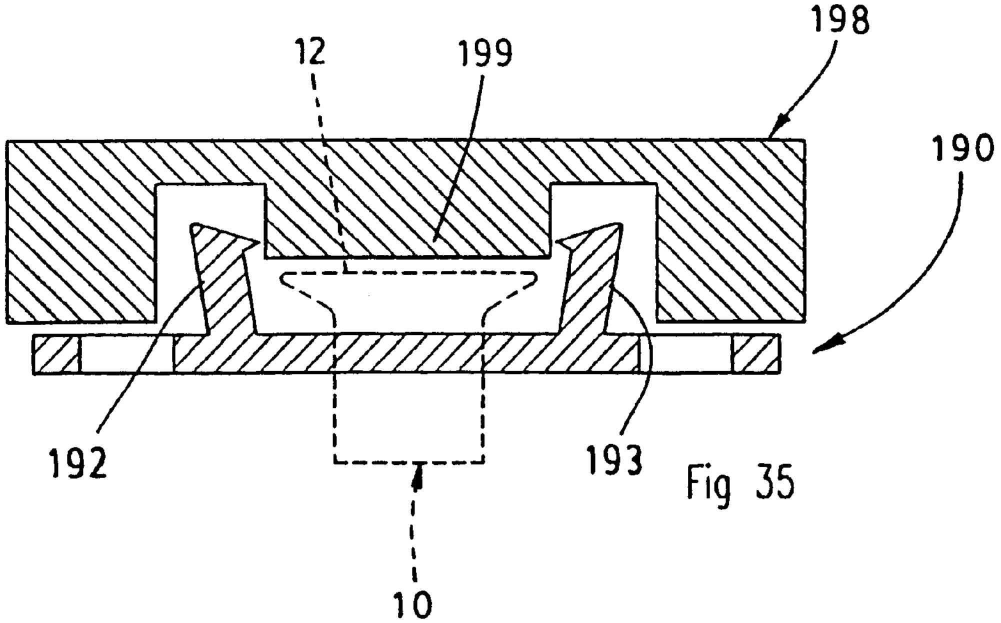
FIG. 35 is a sectional end view showing the release of the head of the rivet from the formations in a feeder head.

As shown in FIG. 35, the guide assembly 198 for the fastening machine may have a divergent block 199 to move the formations 192, 194 of a tape 190 outwardly to expose the heads 12 of the rivets 10 to the punch (not shown).

Figure 37:
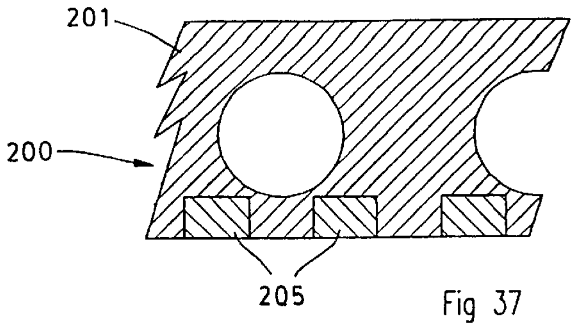
FIG. 37 is a side view of the eighteenth embodiment.
Figure 36:
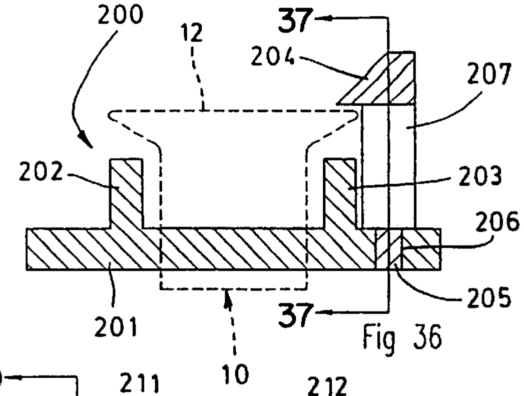
FIG. 36 is a sectional end view of an eighteenth embodiment.

In tape 200 (see FIGS. 30 and 37), the heads 12 of the rivets 10 are supported above the web 201 on parallel flanges 202, 205, while the formation 204 has pegs 205 received in sockets 206 along one side of the web 201, drive holes 207 being provided in the formations 204.

Figure 39:
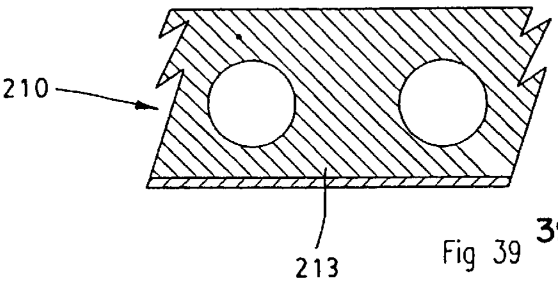
FIG. 39 is a side view of the nineteenth embodiment.
Figure 38:
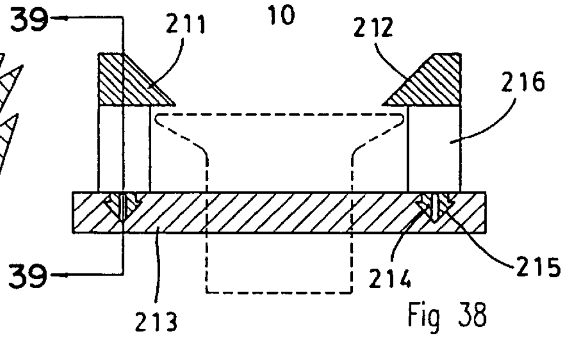
FIG. 38 is a sectional end view of a nineteenth embodiment.

Tape 210 (see FIGS. 38 and 39) has formations 211, 212 along each side of the web 213, the formations having dovetail extensions 214 received in grooves 215 in the web 213, with drive holes 216 in the formations 211, 212.

Figure 40:
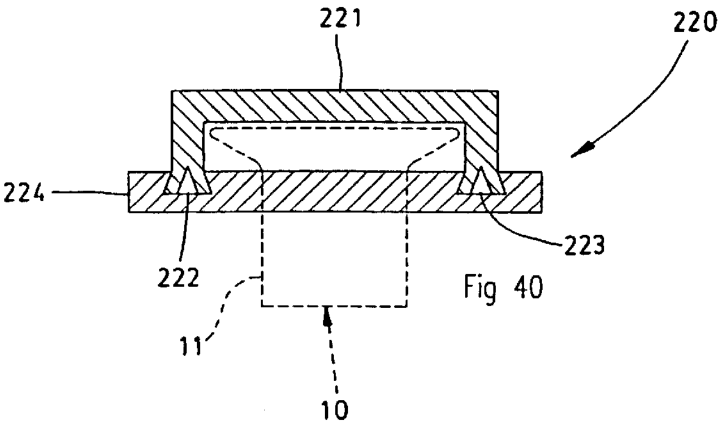
FIG. 40 is an end view of a twentieth embodiment.

Tape 220 (of FIG. 40) has a cover strip 221 overlying the rivet 10, with its side walls engaged in dovetail grooves 222, 223 along the web 224 on opposite sides of the holes for the rivet stems 11.

Figure 41:
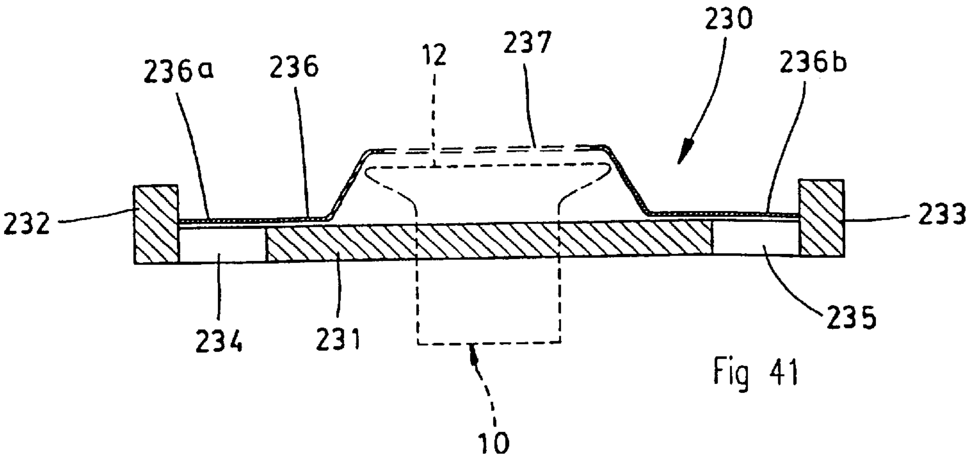
FIG. 41 is an end view of the twenty-first embodiment.

Referring now to FIG. 41, the tape 230 has a web 231 interconnecting side flanges 232, 233 and incorporating two rows of drive holes 234, 235. A cover strip 236 overlies the rivet heads and has its sides adhered to the web 231. The cover strip 236 may have holes 237 aligned with the heads 12 of the rivets 10 as that only minimal amounts of the cover strip 236 may be displaced by the punch (not shown). Alternatively, the single cover strip may be substituted by a pair of side strips 236*a*, 236*b*, with a central gap (237) above the rivets 10.

Figure 42:
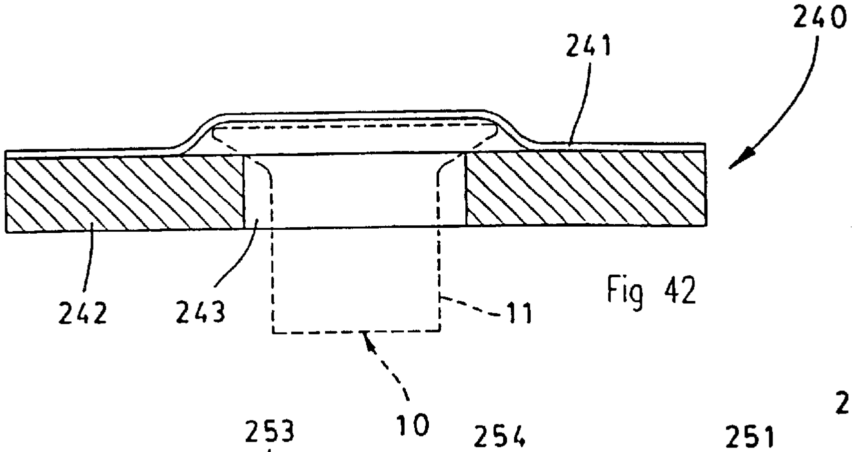
FIG. 42 is an end view of a twenty-second embodiment.

Tape 240 (see FIG. 42) has a similar cover strip 241 adhered to the web 242. (Drive holes may be provided intermediate respective pairs of stem holes 243, or the rivets may be advanced by engagement with the rivet stems 11.)

Figure 43:
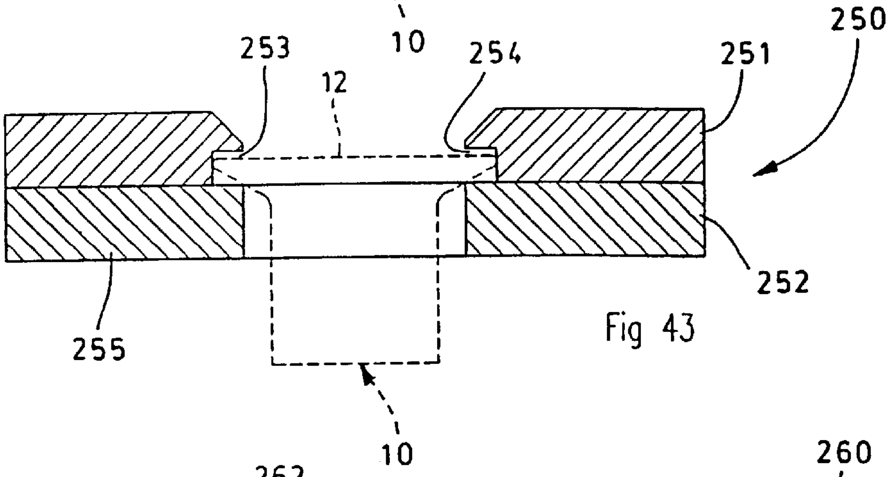
FIG. 43 is an end view of a twenty-third embodiment.
Figure 44:
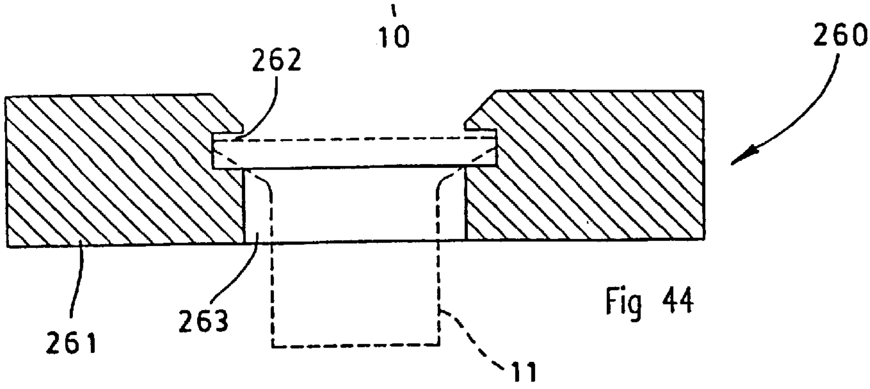
FIG. 44 is an end view of a twenty-fourth embodiment.

Tape 250 (of FIG. 43) is laminated from upper and lower strips 251, 252 where the rivet heads 12 are engaged in grooves 253, 254 along the web 255 formed by the strips 251, 252. Tape 260 (of FIG. 44) is similar to tape 250 except that the web 261 is formed from a single strip. (In a modified embodiment, the heads are received in annular grooves 262 about the stem holes 263.)

In tapes 240, 250, 260, the diameter of the stem holes 243, 263 may be much greater than the diameter of the rivet stems 11, so that the rivets 10 may be more easily pushed through the webs 242, 255, 261 with minimal distortion of the tapes. Alternatively, or in addition, the upper ends of the holes may be countersunk to support the rivet heads 12.

Figure 46:
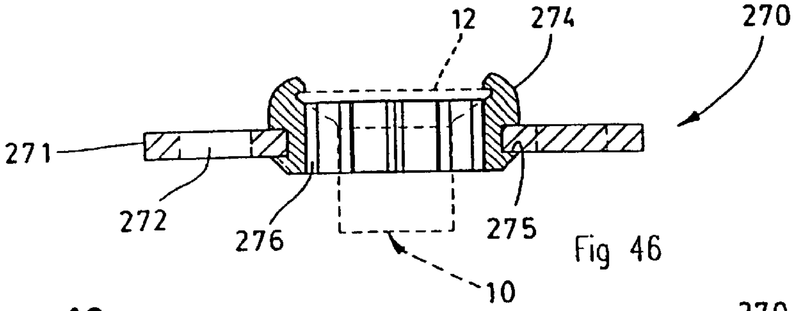
FIG. 46 is a sectional end view of the twenty-fifth embodiment.
Figure 45:
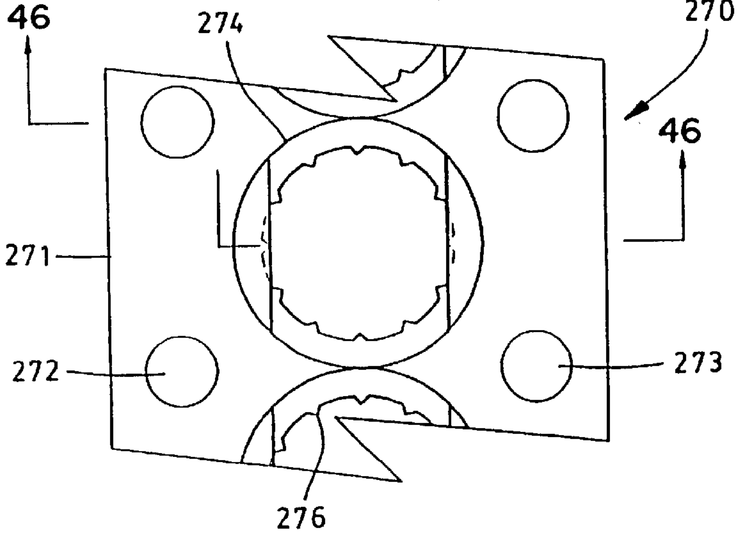
FIG. 45 is a plan view of a twenty-fifth embodiment.

Tape 270 of FIGS. 45 and 46 has a planar web 271 with drive holes 272, 273 along each side. Annular grommets 274 are provided in the tape 270 at regular intervals, the web 271 engaging peripheral grooves 275 in the grommets 274. Axial protrusions 276 in the bores of the grommets 274 engage the rivet head 12 (and optionally the rivet shank 11) to retain the rivets 10 until they are driven from the grommets 274 by the punch of the fastening machine. The grommets 274 remain in the tape 270.

Figure 48:
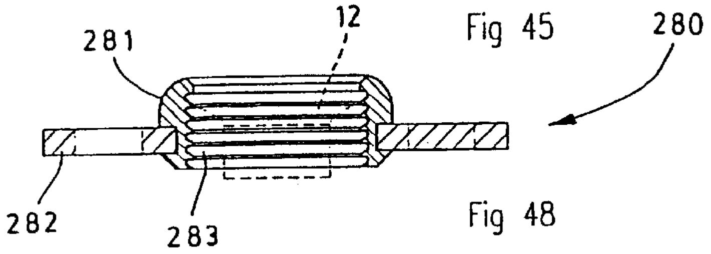
FIG. 48 is a sectional end view of the twenty-sixth embodiment;-Page
Figure 47:
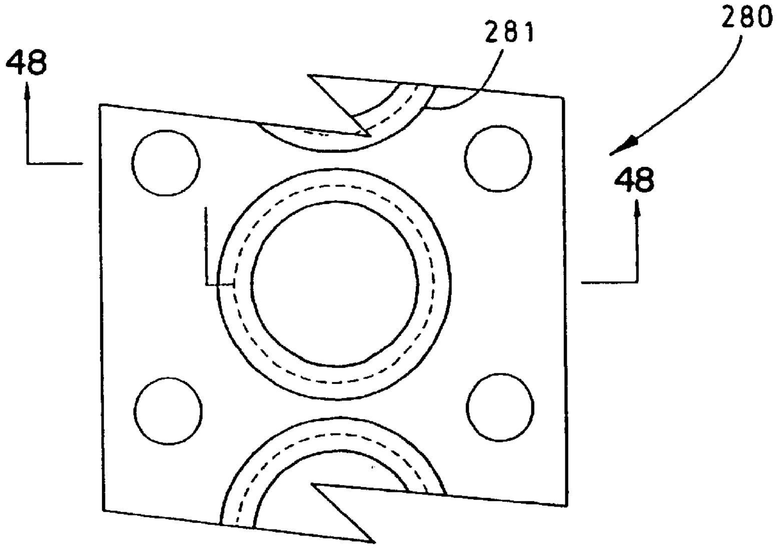
FIG. 47 is a plan view of a twenty-sixth embodiment.

Tape 280 of FIGS. 47 and 48 is generally similar except that the grommets 281, in the web 282, have annular grooves 283 to engage the rivet heads 12, the control the rivets' exit from the grommets 281 to create an anti-tumbling function.

The grommets 274, 281 may be pushed from the webs 271, 282 of tapes 270, 280 with the rivets 10, to act as centralising devices, obviating the need for balls to centralise the rivets in front of the punch and also reduce the diameter of the nose of the fastening machine in difficult access applications, the grommets 275, 281 becoming waste products.

Figure 49:
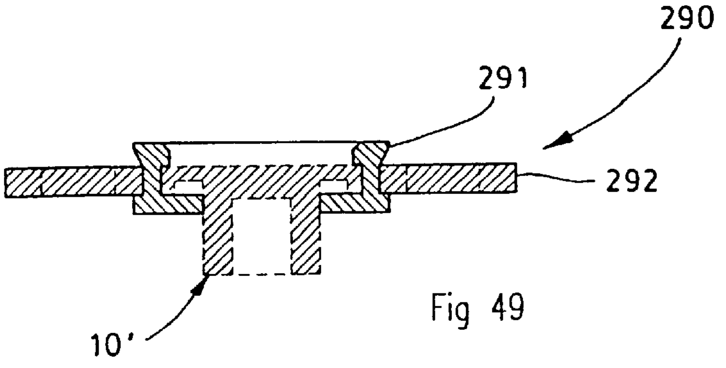
FIG. 49 is a sectional end view of a twenty-seventh embodiment.
Figure 50:
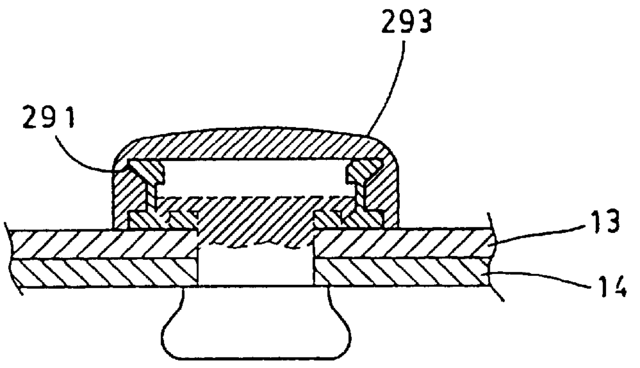
FIG. 50 is a sectional end view of a clinched joint using the tape of FIG. 49.

FIGS. 49 and 50 show an arrangement where the rivet or slug 10' (for clinching two workpieces 13, 14 together) is inserted into a grommet 291 in the web 292 of a tape 290.

The grommet 291 and slug 10' are released from the web 292 of the tape 290 during the clinching operation and a trim cap or strip 293 may be secured to the grommet 291.

The workpieces 13, 14 may be of metal, plastics, rubber and/or insulating material and potential applications for this arrangement include:

(a) trim holders;

(b) shock absorbers;

(c) automobile bumpers;

(d) bearings;

(e) spacers/separators;

(f) locating spigots;

(g) furniture feet;

(h) wheels; and (i) insulators;

or other volume assembly applications.

Figure 51:
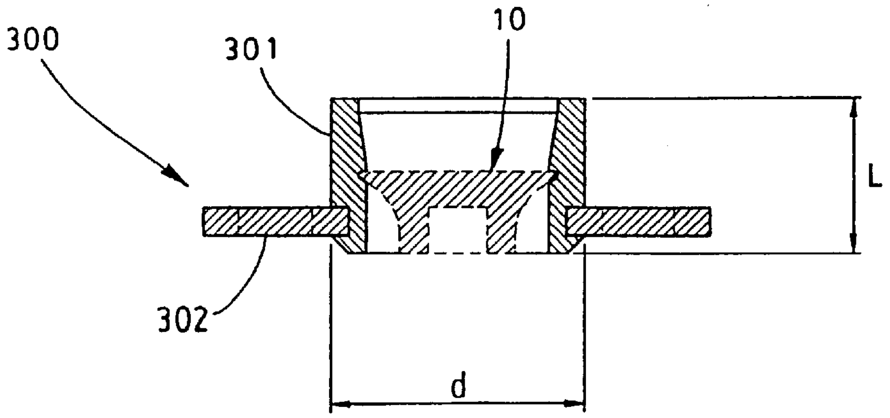
FIG. 51 is a sectional end view of a twenty-eight embodiment.

In applications where the rivets 10 are geometrically unstable, the tape 300 of FIG. 51 has the rivet 10 in a grommet 301, where its length L is equal to, or greater than, its diameter d, the grommet 301 being pushed from the web 302 of the tape 300 with the rivet 10.

Figure 54:
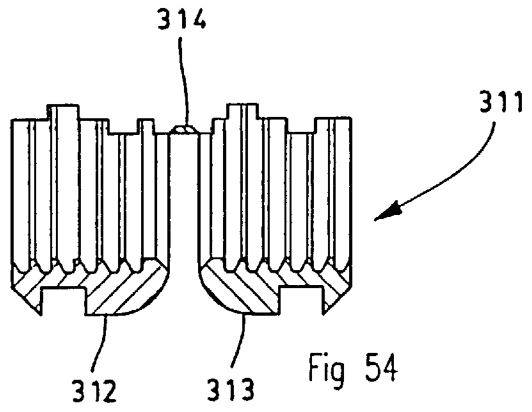
FIG. 54 is a sectional view of the grommet in the tape of FIGS. 52 and 53.
Figure 53:
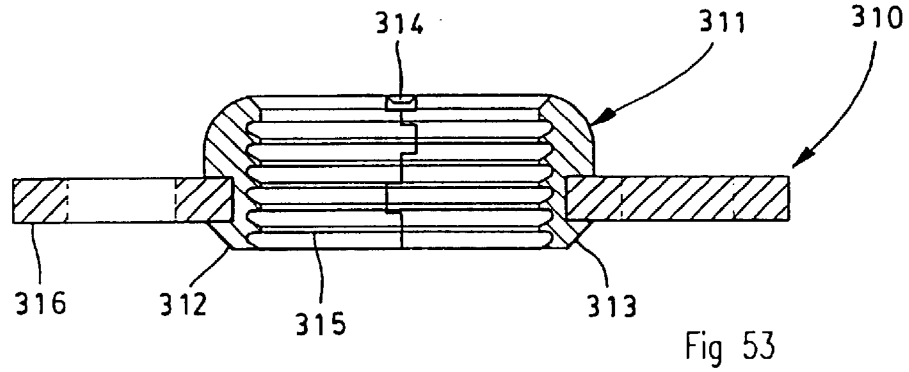
FIG. 53 is a sectional end view of the twenty-ninth embodiment.
Figure 52:
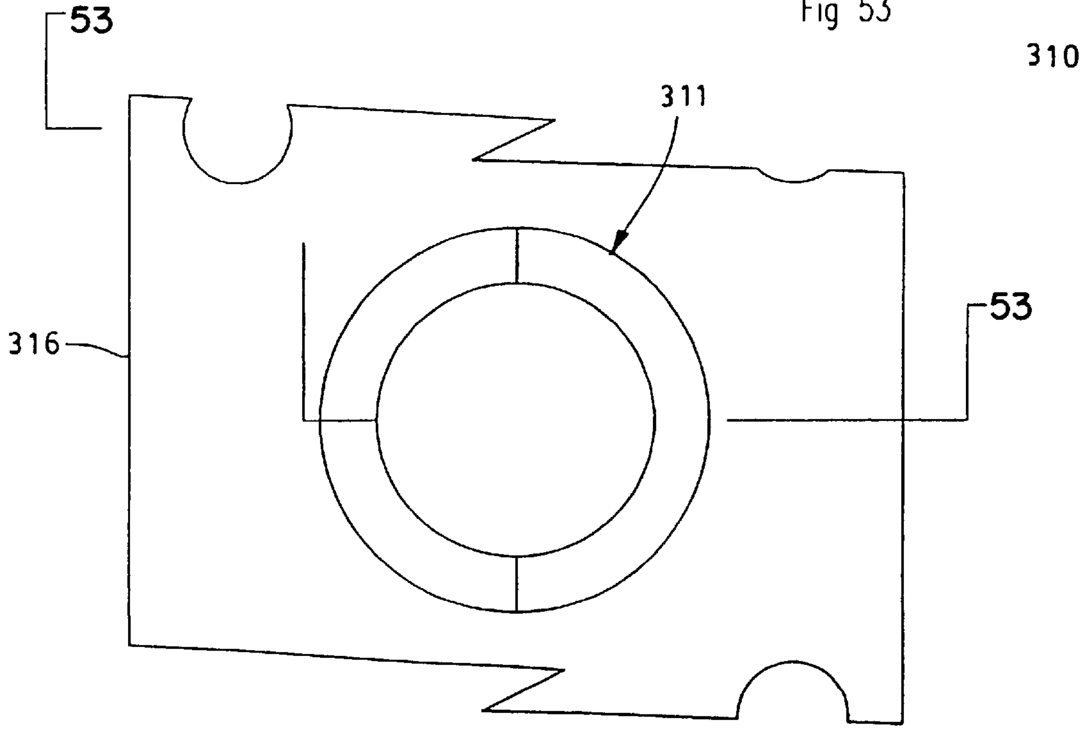
FIG. 52 is a plan view of a twenty-ninth embodiment.

To minimise the moulding costs of the grommets, FIGS. 52 to 54 show that the tape 310 has grommets 311 moulded in two halves 312, 313 and interconnected by an integral hinge 314. The annular grooves 315 trap the rivet head and allow the rivet to be released in a controlled (non-tumbling) manner. When the rivet is engaged by the punch, the grommet 311 may remain secured to the web 316, or may be released from the web 316 with the rivet.

In the embodiments of FIGS. 45 to 54, the rivets 10 or slugs 10' will preferably be inserted or placed in the grommets 274, 281, 291, 301, 311 before these are in turn engaged in the webs 271, 282, 292, 302, 316 of the tapes 270, 280, 290, 300, 310. This will protect the rivets 10 or slugs 10' as they are collated into the tapes.

Figure 56:
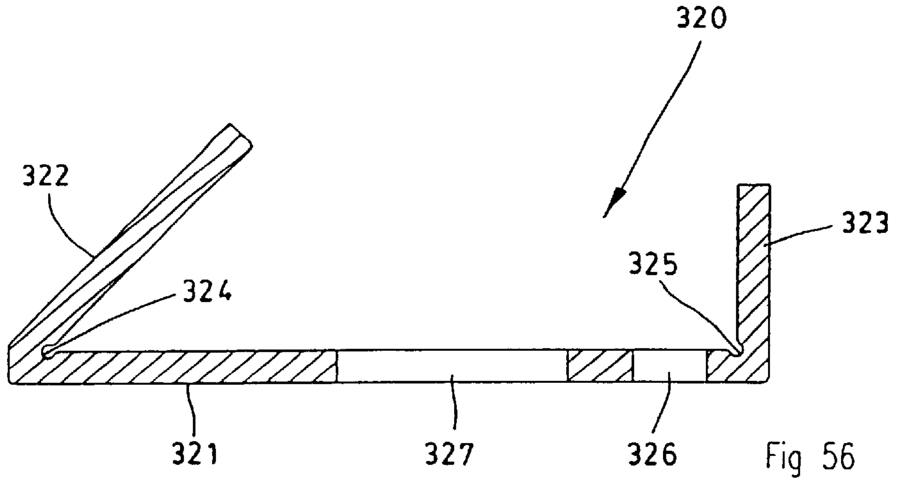
Figure 57:
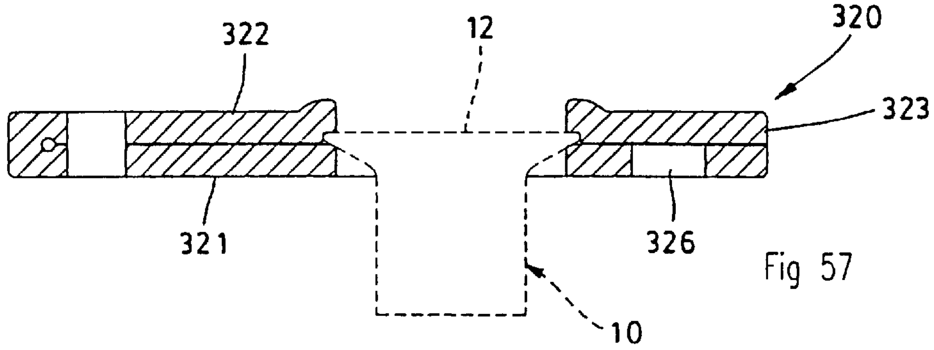
FIG. 57 is a sectional view showing the engagement of a fastener in the tape of FIGS. 55 and 56.
Figure 55:
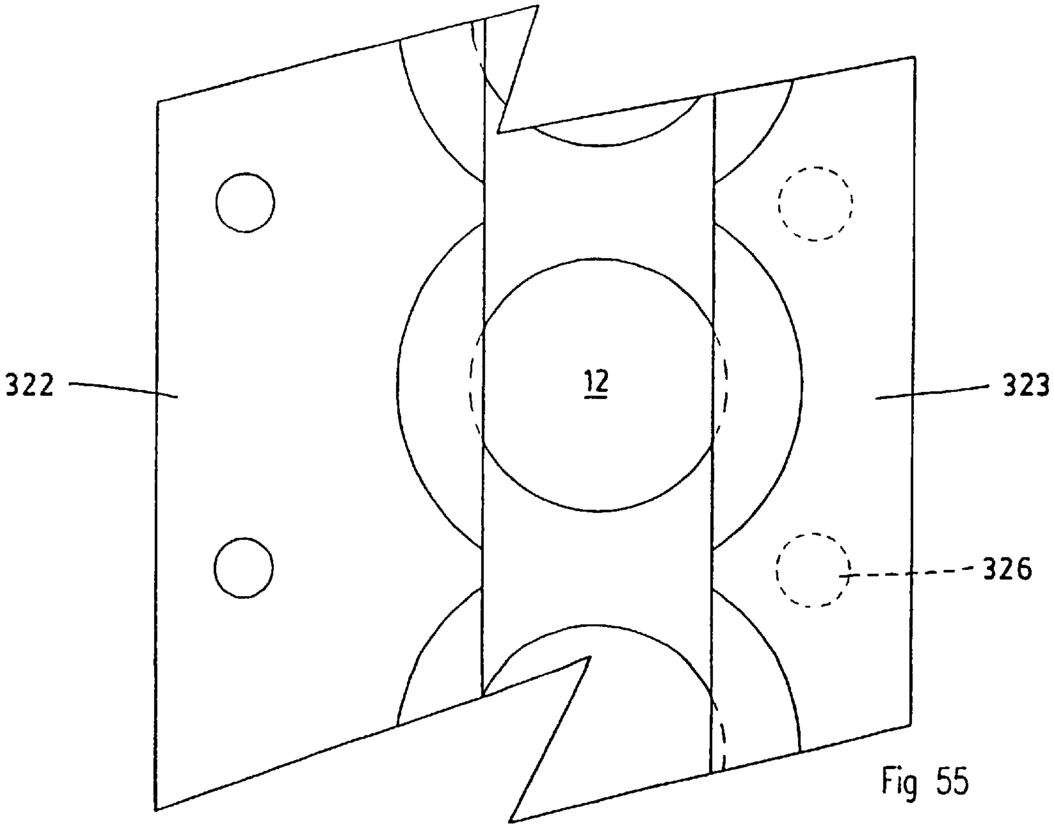

FIGS. 55 to 57 show a tape 320 where the web 321 has side extensions 322 and 323 connected along opposed sides of the web 321 by integral hinges 324, 325.

The tape 320 is advanced by an indexing finger (not shown) which engages an indexing hole 326 in the web 321. The tape 320 is advanced and the rivet 10 is engaged in a hole 327 in the web The side extensions 322, 323 are folded down (eg. by guides) and engage the head 12 of the rivet along opposite sides thereof. The side extensions 322, 323 may be fixed to the web by adhesives, R. F. welding (eg. using annular welding heads) or the like bonding means.

This tape 320 can accommodate rivets with a wide range of head and stem diameter and head configurations.

Tape 330 of FIGS. 58 and 59 is suitable for a riveting machine 400 (see FIG. 60) where the feeder has a reciprocating head 401 with wire fingers 402 arranged in pairs.

The tape 330 has a web 331 where the head 12 of the rivet 10 is engaged by side formations 332, 333. Slots 334 along each side of the tape have a side wall at an angle to the longitudinal axis of the tape and an end wall transverse to the axis.

The fingers 402 move along the tape in one direction and then, when reversed, advance the tape by engagement with the end walls of the slots 334.

In addition, as hereinbefore described, the grommets can prevent unwanted tumbling of the rivets 10 or slugs 10' as they are advanced into alignment with the punches of the fastening machines.

It will be readily apparent to the skilled addressee that the carrier tapes locate, and releasably restrain, the rivets 10 in the tapes until they are to be driven therefrom by the punch of the fastening machine while the cover strips enable the heads of the rivets to be protected against damage during transport and advancement of rivets from the tape by the punches.

While the carrier tapes (or formations) have been shown with driving holes/slots or the like for advancement of the tape, these may be omitted and the tapes advanced by engagement of the feeder with the heads and/or stems of the fasteners.

Various changes and modifications may be made to the embodiments described and illustrated without departing from the scope of the present invention defined in the appended claims.

What is claim d is:

1. A carrier tape in combination with fasteners, each fastener having a stem and a head, the tape including:

a substantially planar web having a top surface;

a plurality of substantially equally spaced holes formed in the web to receive the stems of the fasteners; and a plurality of spaced, discrete formations integrally joined to the web, each of the formations designed to releasably engage the head of a fastener with the stem of the fastener received in a respective hole, the formations being upstanding from the top surface of the web and having an inwardly directed engagement portion spaced from the web which engages the heads of the fasteners so that the heads are received between the engagement portion and the web, the formations being deformable to allow a fastener driving means to pass downwardly to permit the fasteners to be driven through the web and thereby released from the tape.

2. A tape as claimed claim 1 wherein: at least one row of secondary holes or slots are provided along the formations, for driving engagement with a drive means of a feeder head.

3. A tape as claimed in claim 1 wherein:

weakening lines are provided transversely of the web, equally spaced between the holes for the stems, to provide bending axes for the tape.

4. A tape as claimed in claim 3 wherein:

weakening lines or slots are provided in the formations in alignment with the weakening lines in the web.

5. A tape as claimed in claim 3 wherein:

radial weakening lines are provided about the holes for the stems to assist in the release of the stems from the tape by the fastener driving means.

6. A tape as claimed in claim 1, wherein the formations are integrally joined to the web at a position spaced from the respective holes.

* * * * *